(12) United States Patent
Kobayashi et al.

(10) Patent No.: US 12,461,686 B2
(45) Date of Patent: *Nov. 4, 2025

(54) MEMORY SYSTEM

(71) Applicant: Kioxia Corporation, Tokyo (JP)

(72) Inventors: Tasuku Kobayashi, Yokohama Kanagawa (JP); Daisuke Uchida, Fujisawa Kanagawa (JP); Michita Fujii, Yokohama Kanagawa (JP)

(73) Assignee: Kioxia Corporation, Tokyo (JP)

( * ) Notice: Subject to any disclaimer, the term of this patent is extended or adjusted under 35 U.S.C. 154(b) by 66 days.

This patent is subject to a terminal disclaimer.

(21) Appl. No.: 18/305,791

(22) Filed: Apr. 24, 2023

(65) Prior Publication Data

US 2023/0259307 A1 Aug. 17, 2023

Related U.S. Application Data

(63) Continuation of application No. 17/184,993, filed on Feb. 25, 2021, now Pat. No. 11,662,945.

(30) Foreign Application Priority Data

Oct. 14, 2020 (JP) .................................. 2020-173165

(51) Int. Cl.
*G06F 3/06* (2006.01)
*G06F 9/4401* (2018.01)
*G06F 12/10* (2016.01)

(52) U.S. Cl.
CPC .......... *G06F 3/0659* (2013.01); *G06F 3/0604* (2013.01); *G06F 3/0634* (2013.01);
(Continued)

(58) Field of Classification Search
CPC .... G06F 3/0659; G06F 3/0604; G06F 3/0634; G06F 3/0679; G06F 9/4418; G06F 12/10; G06F 2212/657
See application file for complete search history.

(56) References Cited

U.S. PATENT DOCUMENTS

2015/0023101 A1 1/2015 Tanaka
2017/0052583 A1 2/2017 Adavi et al.
(Continued)

FOREIGN PATENT DOCUMENTS

| CN | 110554972 A | 12/2019 |
|---|---|---|
| JP | 2015-232772 A | 12/2015 |
| JP | 2018-156707 A | 10/2018 |

*Primary Examiner* — Gary W. Cygiel
(74) *Attorney, Agent, or Firm* — Kim & Stewart LLP

(57) ABSTRACT

A memory system includes a nonvolatile memory that stores table data and a memory controller for writing and reading data to and from the nonvolatile memory. The memory controller includes a volatile memory that can be in either a retention state during which power is supplied thereto or a power down state during which the power supplied thereto is cut off, a timer that measures elapsed time starting from when the memory system transitions to the low power state, and a register in which previously measured elapsed times are stored, and in which a current measured elapsed time is stored when the memory system wakes up from the low power state. The controller controls the transitioning of the volatile memory from the retention state to the power down state, if the measured elapsed time is greater than a threshold value, which is calculated based on the previously measured elapsed times.

20 Claims, 7 Drawing Sheets

(52) U.S. Cl.
CPC .......... *G06F 3/0679* (2013.01); *G06F 9/4418* (2013.01); *G06F 12/10* (2013.01); *G06F 2212/657* (2013.01)

(56) References Cited

U.S. PATENT DOCUMENTS

| | | |
|---|---|---|
| 2018/0217655 A1 | 8/2018 | Higgs et al. |
| 2018/0268893 A1 | 9/2018 | Ikeda et al. |
| 2018/0300208 A1 | 10/2018 | Oruganti et al. |
| 2019/0369888 A1 | 12/2019 | Hsiao et al. |
| 2021/0201986 A1* | 7/2021 | Brandl .............. G11C 11/40615 |

* cited by examiner

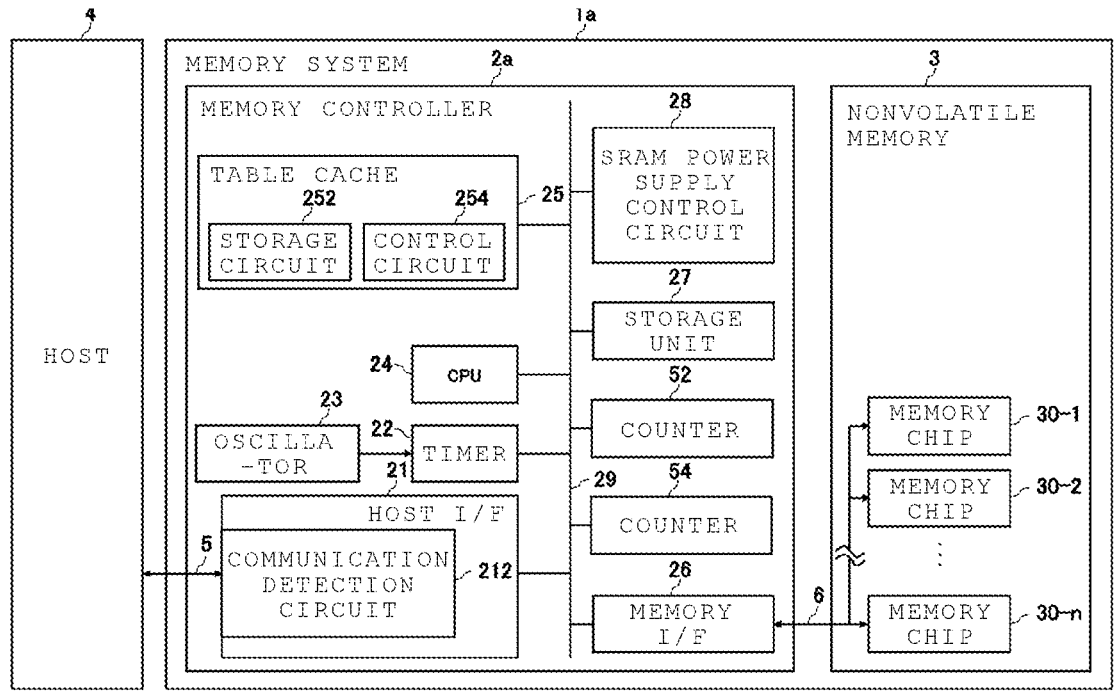
FIG. 12
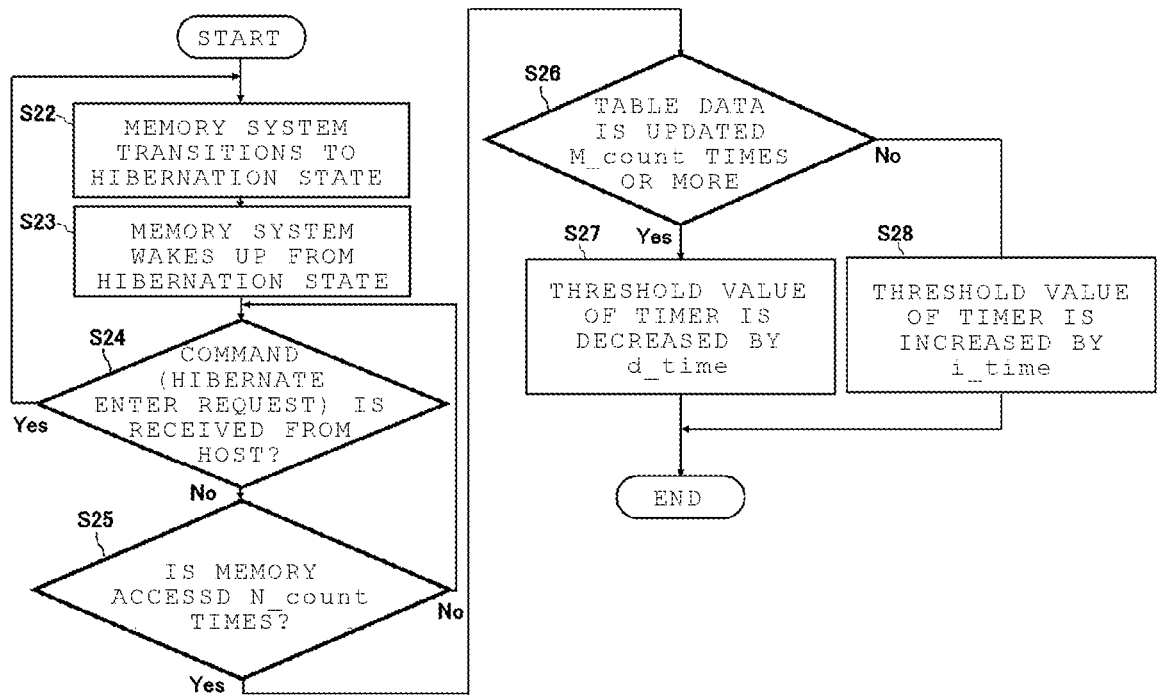

MEMORY SYSTEM

CROSS-REFERENCE TO RELATED APPLICATIONS

This application is a continuation of U.S. patent application Ser. No. 17/184,993, filed on Feb. 25, 2021, which is based upon and claims the benefit of priority from Japanese Patent Application No. 2020-173165, filed on Oct. 14, 2020, the entire contents of each of which are incorporated herein by reference.

FIELD

Embodiments described herein relate generally to a memory system.

BACKGROUND

A memory system including a nonvolatile memory such as a NAND-type flash memory and a memory controller is known.

BRIEF DESCRIPTION OF THE DRAWINGS

FIG. 11 is a diagram illustrating an overall configuration example of a memory system according to a second embodiment.

FIG. 12 is a diagram illustrating an operation example of the memory system according to the second embodiment.

DETAILED DESCRIPTION

Figure 1:
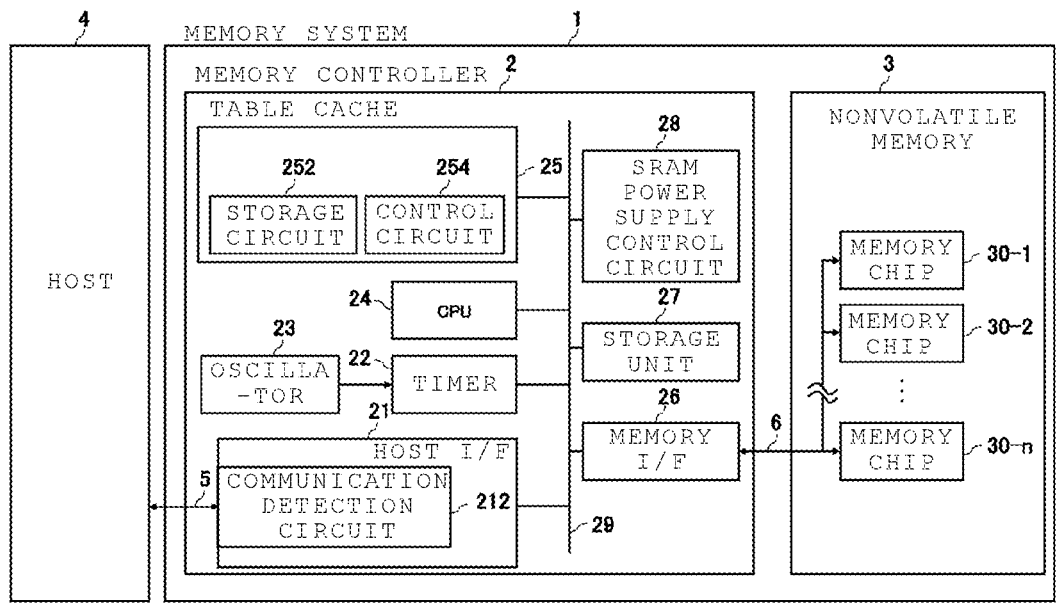
FIG. 1 is a diagram illustrating an overall configuration example of a memory system according to a first embodiment.

Embodiments provide a memory system that can reduce a current consumption by a memory controller.

In general, according to one embodiment, a memory system is a memory system capable of being connected to a host and capable of transitioning to a low power state or a power off state in response to a command from the host. The memory system includes a nonvolatile memory that stores table data; and a memory controller that performs predetermined control including writing and reading data to and from the nonvolatile memory based on a request from the host. The memory controller includes a volatile memory that can be in either a retention state during which power is supplied thereto or a power down state during which the power supplied thereto is cut off, a timer configured to measure elapsed time starting from when the memory system transitions to the low power state, and a register in which one or more previously measured elapsed times are stored, and in which a current measured elapsed time is stored when the memory system wakes up from the low power state. The controller controls a timing of transitioning the volatile memory from the retention state to the power down state, if the measured elapsed time is greater than a threshold value, which is calculated based on the one or more previously measured elapsed times.

In the following, embodiments are described with reference to the drawings. In the following description, components having the same function and configuration are denoted by the same reference numerals. Further, each embodiment described below is an example of an apparatus and a method for embodying the technical idea of the embodiments, and the arrangement of each component and the connection relationship between each component are not limited to the embodiments described below.

Each functional block can be realized as hardware, computer software, or a combination of both. Therefore, it is generally described in terms of their functionality and it should be clear that each functional block is any of hardware, computer software, or a combination of both. Furthermore, it is not essential that each functional block be divided as in the example of the illustrated embodiments. For example, some functions may be performed in cooperation with a functional block other than the illustrated functional block. Further, the illustrated functional block may be configured to be further divided into smaller functional sub-blocks.

(1) First Embodiment

A memory system of a first embodiment is described with reference to FIGS. 1 to 9.

(1)-(a) Configuration Example of Memory System

FIG. 1 is a block diagram illustrating an overall configuration example of a memory system 1 connected to a host 4. The memory system 1 is connected to the host 4 via a communication line 5 and functions as an external storage device of the host 4. The memory system 1 is, for example, a flash memory for embedded use conforming to a universal flash storage (UFS) standard, an embedded multimedia card (eMMC) standard, or the like, or a solid state drive (SSD). The memory system 1 includes a memory controller 2 and a nonvolatile memory 3.

For example, the host 4 may be an information processing device such as a personal computer, a mobile phone, or an imaging device, may be a mobile terminal such as a tablet computer or a smart phone, may be a game device, or may be an in-vehicle terminal such as a car navigation system. The host 4 and the memory system 1 can send and receive packets via the communication line 5, for example, conforming to the UFS standard, the serial attached SCSI (SAS) standard, the serial advanced technology attachment (SATA) standard, the peripheral component interconnect express (PCIe)® standard, a non-volatile memory express (NVMe)® standard.

The memory system 1 transitions to a hibernation state by receiving a command (e.g., Hibernate enter request) for transitioning the host 4 to the hibernation state. The memory system 1 wakes up from the hibernation state by receiving a command (e.g., Hibernate exit request) from the host 4. The hibernation state refers to a state where the power consumption is reduced when the memory system 1 is not used. It is a low power state. The memory system 1 may transition from the hibernation state to the power off state by the request from the host 4. The power off state is a state where the power supply to the memory system 1 is completely cut off. Particularly, in a memory system that is not connected to an AC power supply but uses a battery as a power supply, the power supply can be extended for a long period of time by appropriate transition to the hibernation state.

The memory controller 2 includes, for example, a host interface (I/F) circuit 21, a timer 22, an oscillator 23, a central processing unit (CPU) 24, a table cache 25, a memory interface (I/F) circuit 26, a storage unit 27, and a static random access memory (SRAM) power supply control circuit 28. They are connected to each other via a bus 29. The memory controller 2 can be implemented as a controller package including, for example, a System-on-a-Chip (SoC).

The host I/F circuit 21 performs the interface functions between the memory controller 2 and the host 4. The host I/F circuit 21 is connected to the host 4 via the communication line 5. The connection may be wirelessly made without the communication line 5. The host I/F circuit 21 includes a communication detection circuit 212. The communication detection circuit 212 detects the amplitude of a signal in the signal line connected to the host 4. If the memory system 1 detects that the amplitude of the signal from the host 4 in the signal line is above a threshold level, the memory system 1 considers that the communication with the host 4 has started and wakes up from the hibernation state.

If the memory system 1 transitions to the hibernation state, the timer 22 starts the measurement of time elapsed. Then, if the memory system 1 wakes up from the hibernation state, the timer 22 initializes the value of the elapsed time.

The oscillator 23 is connected to the timer 22. The oscillator 23 is, for example, an RC oscillator. The oscillator 23 can operate even if the memory system 1 is in the hibernation state. Therefore, if the oscillator 23 operates, the measurement of the timer 22 can be continued. If the table cache 25 described below transitions to the power down state, the oscillator 23 stops operation.

The CPU 24 controls the operation of the entire memory controller 2. The program that controls the CPU 24 uses firmware (a control program and the like) stored in a read only memory (ROM) 272 described below (see FIG. 6) or executes a predetermined process by loading a program stored in the ROM 272 to a random access memory (RAM) 274 described below (see FIG. 6). That is, the CPU 24 generates various tables for storage in the RAM 274, receives a write command, a read command, and an erase command from the host 4, and performs data writing, data reading, and data erasing with respect to the nonvolatile memory 3. The command is, for example, referred to as an instruction or a request. The data transmission such as data writing to the nonvolatile memory 3 and data reading from the nonvolatile memory 3 is performed with the external host 4 via the memory I/F circuit 26, the host I/F circuit 21, and the like.

The table cache 25 temporarily stores table data. The table data is a data set with a predetermined size. The table data is, for example, at least a portion of a logical-to-physical address conversion table (L2P table) described below.

The table cache 25 is a circuit configured with a volatile memory such as SRAM or a register. According to the present embodiment, a case where the circuit of the table cache 25 is configured with a retention SRAM 25 is described.

The retention SRAM 25 includes a storage circuit 252 and a control circuit 254. The storage circuit 252 temporarily stores table data. The control circuit 254 performs control required for writing and reading data to and from the storage circuit 252. The control circuit 254 performs, for example, addressing and clock gating control.

Figure 2:
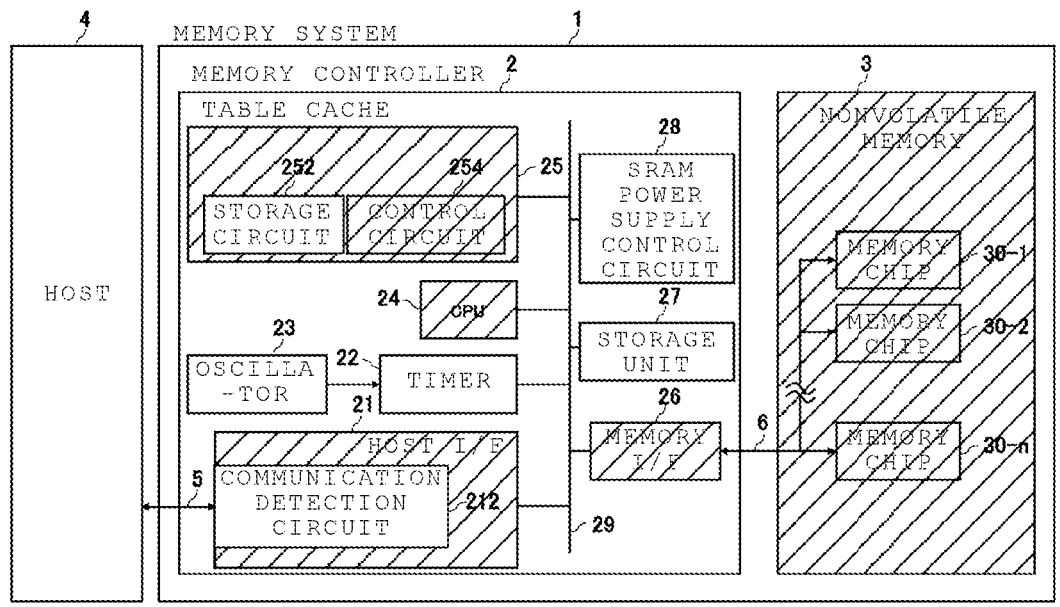
FIG. 2 is an energized state of each block during a retention state in the memory system of FIG. 1.
Figure 3:
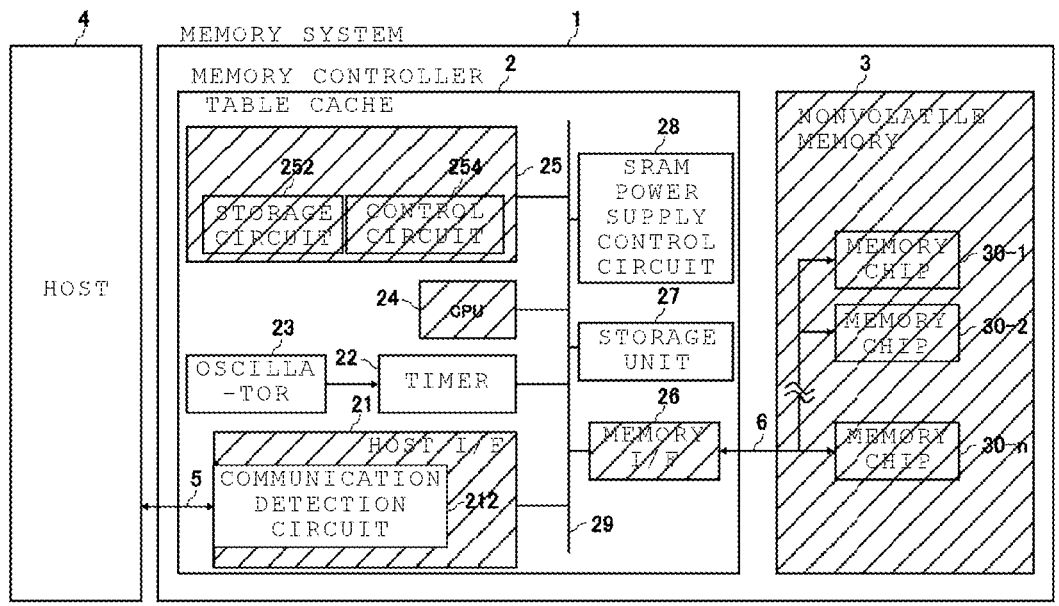
FIG. 3 is an energized state of each block during a power down state in the memory system of FIG. 1.

FIGS. 2 and 3 are diagrams illustrating an energized state of each block in FIG. 1 when the memory system 1 is in the hibernation state. FIG. 2 is an energized state where the retention SRAM 25 is in the retention state. In the retention state, power is supplied to the storage circuit 252 so that the table data can be stored in the table cache 25. On the other hand, when power supply to the control circuit 254 is cut off, so that the power consumption can be reduced, data cannot be input and output to and from the storage circuit 252. FIG. 3 illustrates an energized state when the retention SRAM 25 is in the power down state. The power down state is a state where, in the table cache 25, power supply to each of the storage circuit 252 and the control circuit 254 is cut off so that the power consumption can be reduced more than that in the retention state. The table data stored in the storage circuit 252 is erased. If the memory system 1 is in the hibernation state, as illustrated in the shaded areas in FIGS. 2 and 3, the power supply to the host I/F circuit 21 (excluding the communication detection circuit 212), the CPU 24, the table cache 25 (a portion or the entire portion), the memory I/F circuit 26, and the nonvolatile memory 3 is cut off.

When the memory system 1 transitions to the hibernation state, the retention SRAM 25 may be in either of the two states of the retention state and the power down state.

The timing when the retention SRAM 25 transitions from the retention state to the power down state is determined by a threshold value of the timer 22 set by the CPU 24. In the following description, the time after the retention SRAM 25 transitions to the retention state until the memory system 1 wakes up from the hibernation state or the retention SRAM 25 transitions to the power down state is referred to as retention stay time.

Figure 4:
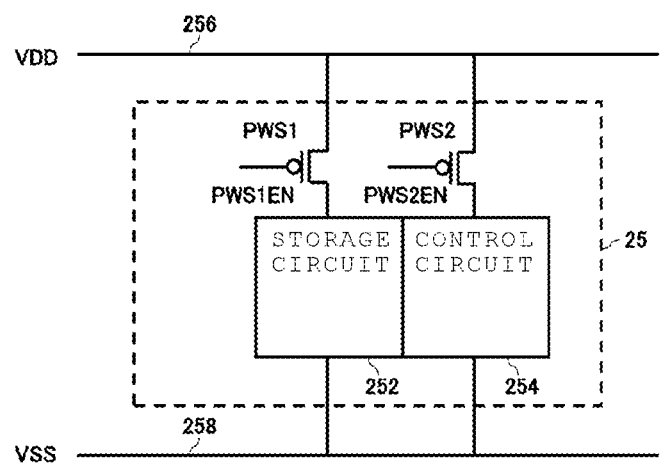
FIG. 4 is a circuit diagram of a retention SRAM according to the first embodiment.

FIG. 4 is a circuit diagram of the retention SRAM 25. In the following, main components of the circuit of the retention SRAM 25 are mainly described. However, components or functions that are not illustrated or described may be present in the circuit of the retention SRAM 25.

A power supply voltage VDD is applied to a power supply line 256, and a ground voltage VSS is applied to a ground line 258.

The power supply voltage VDD is supplied to a power switch PWS1 via a source terminal. The power switch PWS1 supplies or cuts off the power supply voltage VDD with respect to the storage circuit 252 according to a control signal PWS1EN supplied to the gate terminal. That is, if the retention SRAM 25 transitions to the power down state, the power switch PWS1 is turned off by the control signal PWS1EN. As a result, power supply to the storage circuit 252 is cut off.

The power supply voltage VDD is supplied to a power switch PWS2 via a source terminal. The power switch PWS2 supplies or cuts off the power supply voltage VDD with respect to the control circuit 254 according to a control signal PWS2EN supplied to the gate terminal. That is, if the retention SRAM 25 transitions to the retention state, the power switch PWS2 is turned off by the control signal PWS2EN. As a result, the power supply to the control circuit 254 is cut off.

If the memory system 1 wakes up from the hibernation state, the CPU 24 updates the hibernation wake-up time in a register 276 described below. The CPU 24 updates a threshold value and an outlier value of the timer 22. The timer 22 determines by itself whether the measured value is the threshold value or more. The timer 22 determines whether the measured value corresponds to the outlier value. The host 4 sets initial values of the threshold value and the outlier value of the timer 22 to any values. These initial values are used when the memory system 1 first transitions to the hibernation state.

The threshold value of the timer 22 is, for example, n_times times the average value of the history of the hibernation wake-up time (average hibernation wake-up time) held by the register 276. The n_times is a positive integer value larger than x_range described below. If the measured value of the timer 22 is the threshold value or more, the retention SRAM 25 transitions from the retention state to the power down state.

The outlier value of the timer 22 is, for example, a value that corresponds to a range of x_range times or more and less than the threshold value of the average hibernation wake-up time. The x_range is a positive integer value smaller than n_times. If the memory system 1 requires the time corresponding to the outlier value for waking up from the hibernation state, the CPU 24 discards the history of the hibernation wake-up time stored in the register 276. Also, the CPU 24 newly updates the measured value of the timer as the history in the register 276. This operation is executed while the power is supplied to the CPU 24.

Figure 5:
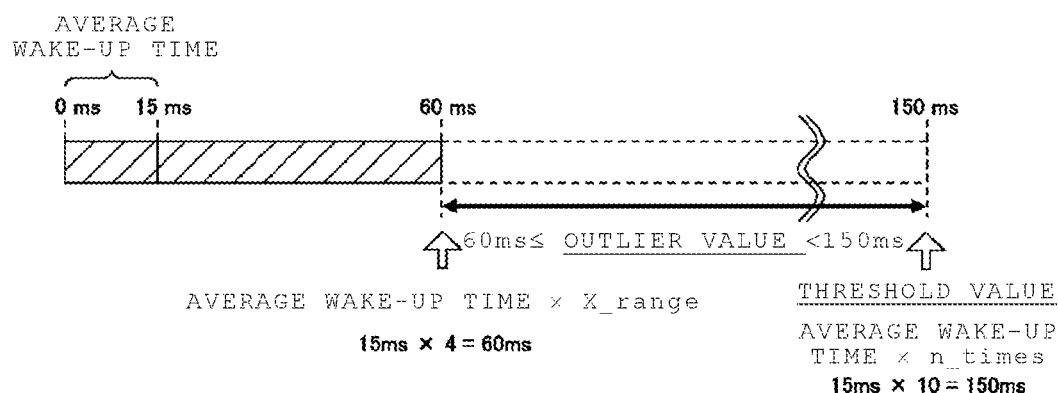
FIG. 5 is a diagram illustrating updates to a threshold value of time and an outlier value of timer in the memory system according to the first embodiment.

FIG. 5 is a diagram illustrating the updates of the threshold value and the outlier value of the timer 22. The CPU 24 sets, for example, n_times to 10 and x_range to 4. If the average hibernation wake-up time is 15 ms, the CPU 24 sets the threshold value of the timer 22 to 15 ms×10=150 ms. The CPU 24 sets the range corresponding to the outlier value of the timer 22 to 15 ms×4=60 ms or more and less than 150 ms.

If the hibernation wake-up time is 75 ms, the hibernation wake-up time corresponds to the outlier value and is a value that deviates significantly from 15 ms which is the average hibernation wake-up time. Therefore, the CPU 24 discards the history of the hibernation wake-up time stored in the register 276 and newly updates the measured value of the timer 22 as the history in the register 276. Subsequently, every time when the memory system 1 repeats the transition and goes into and wakes up from the hibernation state, the history of the hibernation wake-up time accumulates in the register 276.

If the measured value of the timer 22 becomes 150 ms or more which is the threshold value, the retention SRAM 25 transitions from the retention state to the power down state. If the hibernation wake-up time is the threshold value or more, the CPU 24 does not discard or update the history of the hibernation wake-up time stored in the register 276.

The CPU 24 can appropriately change the values of n_times and x_range. The host 4 may change the values of n_times and x_range. Since the threshold value of the timer 22 is determined based on the average hibernation wake-up time, an upper limit value and a lower limit value are set for the threshold value. The upper limit value and the lower limit value of the threshold value can change by the host 4.

Figure 6:
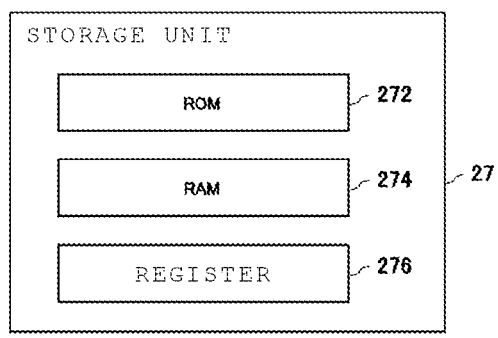
FIG. 6 is a diagram illustrating an example of a configuration of a storage unit according to the first embodiment.

FIG. 6 is a diagram illustrating an example of the configuration of the storage unit 27. The storage unit 27 includes the ROM 272, the RAM 274, and the register 276. The register 276 stores, for example, the upper limit value and the lower limit value of the threshold value of the timer 22 and the history of the hibernation wake-up time.

If the measured value of the timer 22 is the threshold value or more, the SRAM power supply control circuit 28 transitions the retention SRAM 25 from the retention state to the power down state.

The memory I/F circuit 26 performs the interface functions between the memory controller 2 and the nonvolatile memory 3. The memory I/F circuit 26 is connected to a memory chip 30 described below via a communication line 6.

The nonvolatile memory 3 is a NAND-type flash memory including a memory cell having a stacked gate structure or a memory cell having a MONOS structure. In the NAND-type flash memory, generally, the writing and reading are generally performed in units of data called pages, and the erasing is performed in units of data called blocks. The nonvolatile memory 3 can be arranged on the outside of the memory controller 2 and implemented as a nonvolatile memory package. The nonvolatile memory 3 includes one or a plurality of memory chips 30. In FIG. 1, the memory chips 30-1 to 30-*n* (n is a natural number of 1 or more) are provided as an example. Each of the memory chips 30 can operate independently from each other.

The nonvolatile memory 3 stores, for example, the management information such as the user data and the logical-to-physical address conversion table. The logical-to-physical address conversion table is referred to as an address conversion table in the following description. The address conversion table manages the mapping between logical addresses and physical addresses of the nonvolatile memory 3. The logical address is an address used by the host 4 for address designation of the position in the logical space of the memory system 1. As the logical address, the logical block address (LBA) can be used. The physical address is the physical storage position in the nonvolatile memory 3 where data is stored. The address conversion table is used for conversion of the logical address to the physical address indicating the physical storage position in the nonvolatile memory 3 where the data corresponding to the logical address is stored.

Generally, in the initial state such as the state the memory system 1 is in immediately after the power supply is turned on, the table cache 25 is empty. Portions of the address conversion data (table data) used for the logical-to-physical address conversion are then cached in the table cache 25. Subsequently, if the physical address corresponding to the logical address designated by the host 4 (table data at least including this physical address) is present in the table cache 25, the memory controller 2 reads the physical address (table data) from the table cache 25 instead of reading the address conversion table of the nonvolatile memory 3. Accordingly, when the read command is received from the host 4, the number of times of reading the address conversion table of the nonvolatile memory 3 can be reduced, and thus the performance of the memory system 1 can be improved.

Figure 7:
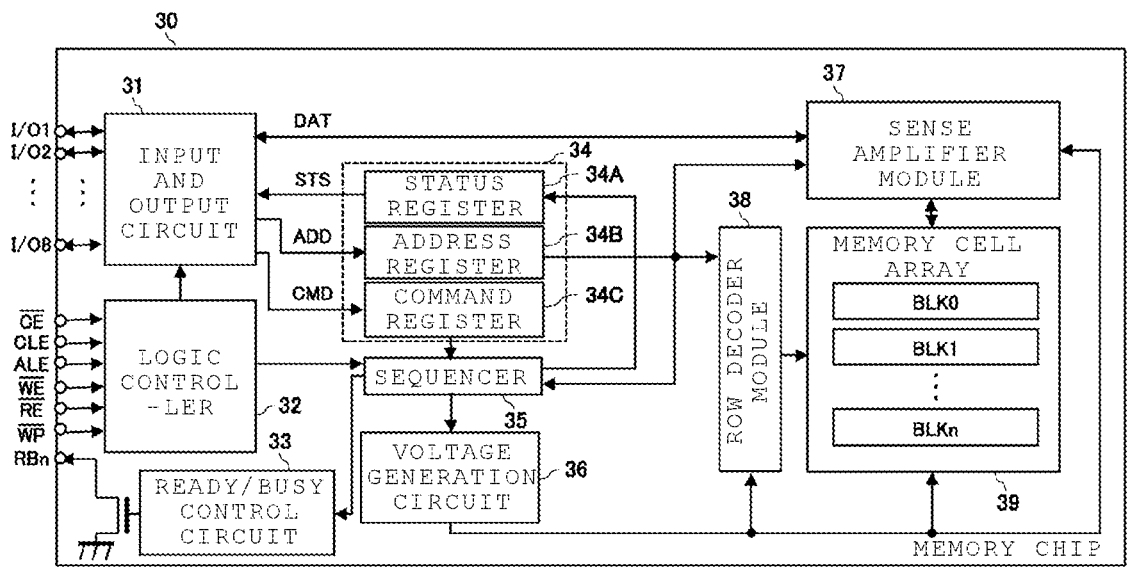
FIG. 7 is a diagram illustrating an example of a configuration of a memory chip according to the first embodiment.

Next, the configuration example of the memory chip 30 is described by using FIG. 7. FIG. 7 is a block diagram illustrating an example of the configuration of the memory chip 30. The memory chip 30 includes an input and output circuit 31, a logic controller 32, a ready/busy control circuit 33, a register 34, a sequencer 35, a voltage generation circuit 36, a sense amplifier module 37, a row decoder module 38, and a memory cell array 39.

The input and output circuit 31 transmits and receives, for example, 8-bit wide input and output signals I/O (I/O1 to I/O8) to and from the memory controller 2. For example, the input and output circuit 31 transmits a write data DAT included in the input and output signals I/O received from the memory controller 2 to the sense amplifier module 37. The input and output circuit 31 transmits the read data DAT transmitted from the sense amplifier module 37 to the memory controller 2 as the input and output signals I/O.

The logic controller 32 controls the input and output circuit 31 and the sequencer 35 based on various control signals received from the memory controller 2. As the various control signals, for example, a chip enable signal /CE, a command latch enable signal CLE, an address latch enable signal ALE, a write enable signal /WE, a read enable signal /RE, and a write protect signal /WP are used. The signal /CE is a signal for enabling the memory chip 30. The signal CLE is a signal for notifying the input and output circuit 31 that the signal input to the memory chip 30 concurrently with the asserted signal CLE is a command CMD. The signal ALE is a signal for notifying the input and output circuit 31 that the signal input to the memory chip 30 concurrently with the asserted signal ALE is the address information ADD. The signals /WE and /RE are, for example, signals for instructing the input and output circuit 31 to and output the input and output signals I/O. The signal /WP is, for example, a signal for causing the memory chip 30 to be in a write protection state when the power supply is turned on and off.

The ready/busy control circuit 33 generates a ready/busy signal RBn based on the operation state of the sequencer 35. The signal RBn is a signal for notifying the memory controller 2 whether the memory chip 30 is in the ready state where an instruction can be read from the memory controller 2 or in the busy state where the instruction cannot be read.

The register 34 includes a status register 34A, an address register 34B, and a command register 34C. The status register 34A, for example, stores status information STS of the sequencer 35 and transmits the status information STS to the input and output circuit 31 based on the instruction of the sequencer 35. The address register 34B stores the address information ADD transmitted from the input and output circuit 31. The block address, column address, and page address included in the address information ADD are respectively used in the row decoder module 38, the sense amplifier module 37, and the voltage generation circuit 36. The command register 34C stores the command CMD transmitted from the input and output circuit 31.

The sequencer 35 controls the operation of the entire memory chip 30 based on the command CMD stored in the command register 34C. For example, the sequencer 35 controls the voltage generation circuit 36, the sense amplifier module 37, the row decoder module 38, and the like and performs various operations such as a write operation, a read operation, or the like.

The voltage generation circuit 36 generates desired voltage based on the control of the sequencer 35 and supplies the generated voltage to the sense amplifier module 37, the row decoder module 38, the memory cell array 39, and the like. For example, the voltage generation circuit 36 applies the desired voltage to the signal line corresponding to the selected word line and the signal line corresponding to the non-selected word line based on the page address stored in the address register 34B.

The sense amplifier module 37 outputs the data DAT read from the memory cell array 39 to the memory controller 2 via the input and output circuit 31. The sense amplifier module 37 transmits the write data DAT read from the memory controller 2 via the input and output circuit 31 to the memory cell array 39.

The row decoder module 38 selects blocks BLK to be subjected to the various operations based on the block address stored in the address register 34B. The row decoder module 38 transmits the voltage supplied the voltage generation circuit 36 to the selected blocks BLK.

The memory cell array 39 includes the plurality of blocks BLK including a plurality of nonvolatile memory cells corresponding to rows and columns. FIG. 7 illustrates the blocks BLK0 to BLKn (n is a natural number of 1 or more) as an example. The memory cell array 39 stores the data applied from the memory controller 2.

(1)-(b) Operation Example of Memory System

Figure 8:
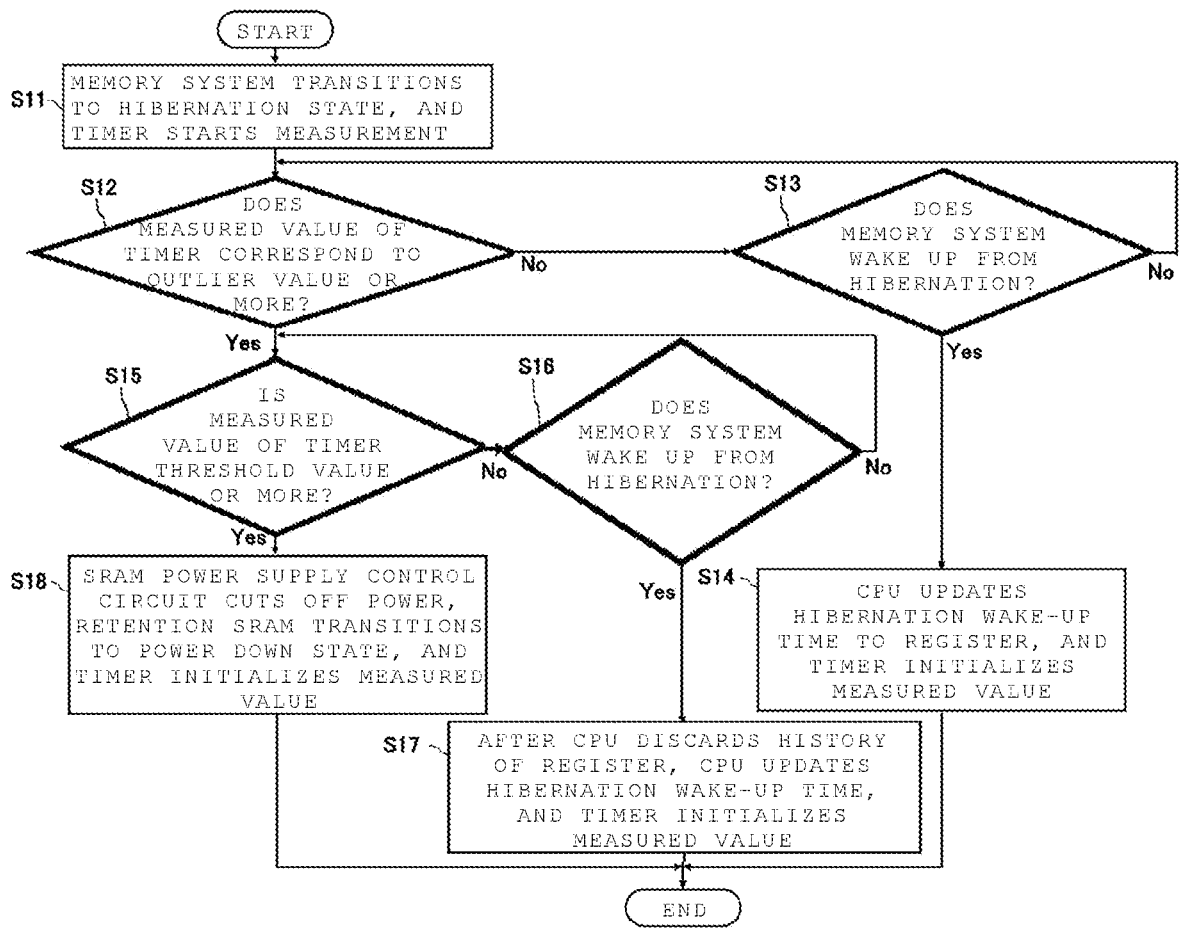
FIG. 8 is a diagram illustrating an operation example of the memory system according to the first embodiment.

Subsequently, the operation example of the memory system 1 is described by using FIG. 8.

First, if the memory system 1 receives the Hibernate enter request command from the host 4 and transitions to the hibernation state, the timer 22 starts the measurement (S11).

If the measured value of the timer 22 corresponds to the outlier value or more (Yes in S12), the process proceeds to S15.

If the measured value of the timer 22 does not correspond to the outlier value (No in S12), the process proceeds to S13.

If the memory system 1 does not receive the Hibernate exit request command from the host 4 and does not wake up from the hibernation state (No in S13), the process returns to S12, and the Same process as described above is performed.

If the memory system 1 receives the Hibernate exit request command from the host 4 and returns from the hibernation state (Yes in S13), the CPU 24 updates the hibernation wake-up time in the register 276, and the timer 22 initializes the measured value (S14). Then, the process ends.

If the measured value of the timer 22 is less than the threshold value (No in S15), the process proceeds to S16.

If the memory system 1 does not receive the Hibernate exit request command from the host 4 and does not wake up from the hibernation state (No in S16), the process returns to S15, and the same process as described above is performed.

If the memory system 1 receives the Hibernate exit request command from the host 4 and wakes up from the hibernation state (Yes in S16), the CPU 24 discards the history of the hibernation wake-up time stored in the register 276 (S17). Then, the CPU 24 updates the hibernation wake-up time in case of Yes in S16 in the register 276 (S17). The timer 22 initializes the measured value (S17). Then, the process ends.

If the measured value of the timer 22 is the threshold value or more (Yes in S15), the SRAM power supply control circuit 28 cuts off the power supply to the storage circuit 252 of the retention SRAM 25, and the retention SRAM 25 transitions to the power down state (S18). Then, the timer 22 initializes the measured value (S18). Then, the process ends.

The value of the threshold value may start from a large value and gradually narrow down to a small value according to the usage status of the memory system.

As described above, the memory system 1 is controlled.

Figure 9:
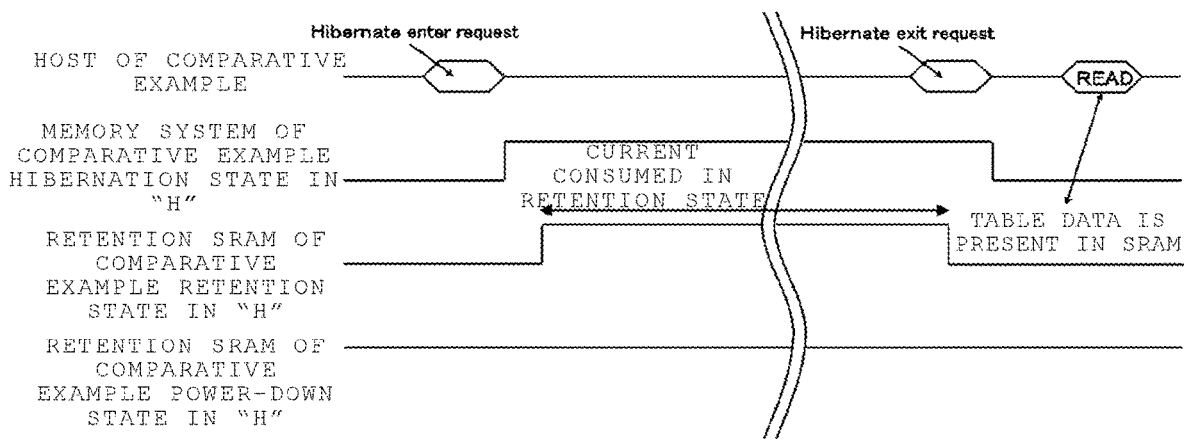
FIG. 9 is a timing chart of a memory system according to a comparative example.
Figure 10:
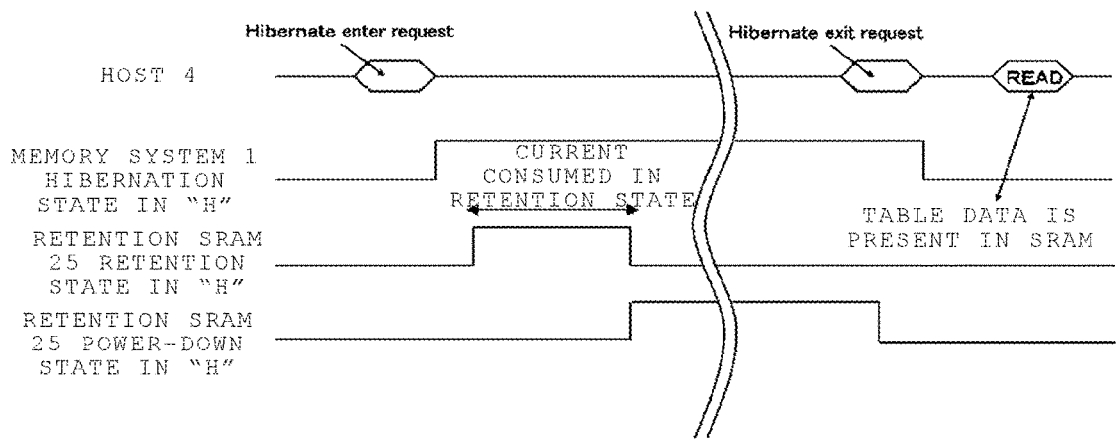
FIG. 10 is a timing chart of the memory system according to the first embodiment.

FIG. 9 is a timing chart of the memory system according to the comparative example. FIG. 10 is a timing chart of the memory system 1 according to the present embodiment. In FIGS. 9 and 10, a case where each memory system or retention SRAM transitions to a certain state is shown as the High ("H") level, and a case where when each memory system or retention SRAM returns from the certain state is shown as the Low ("L") level.

In the memory system of the comparative example, in order to reduce the wake-up time from the hibernation state, the table data is stored in the retention SRAM. In this case, if the hibernation state continues for a long period of time, the current of the retention SRAM is consumed. However, after the memory system wakes up from the hibernation state, the table data stored in the retention SRAM ma y not be referenced at all. In the memory system of the comparative example, even if it is highly likely that the table data stored in the retention SRAM will not be referenced at all, the retention state is maintained until the memory system wakes up from the hibernation state.

On the other hand, in the memory system 1 according to the present embodiment, the threshold value is set for the retention stay time of the retention SRAM 25. The threshold value is calculated based on the average value of the history of the hibernation wake-up time. If the retention stay time of the retention SRAM 25 exceeds the set threshold value, after the memory system 1 wakes up from the hibernation state, it is highly likely that the table data stored in the retention SRAM 25 will be referenced. Therefore, the SRAM power supply control circuit 28 cuts off the power supply to the storage circuit 252 of the retention SRAM 25 and transitions the retention SRAM 25 to the power down state. As a result, the amount of current consumed by storage circuit 252 of the retention SRAM 25 can be reduced.

(2) Second Embodiment

A memory system according to a second embodiment is described with reference to FIGS. 11 to 12.

(2)-(a) Configuration Example of Memory System

FIG. 11 is a block diagram f an overall configuration example of a memory system 1a connected to the host 4. The memory system 1a of the second embodiment is configured in the same manner as the memory system 1 according to the first embodiment, but is different since the memory system 1a of the second embodiment includes a counter 52 and a counter 54.

The counter 52 counts the number of times of the table data in the retention SRAM 25 is newly updated. The table data is, for example, at least a portion of the logical-to-physical address conversion table. The counter 54 counts the number of times of the memory access. The memory access refers to writing data and reading data to and from the nonvolatile memory 3. If the memory system 1a transitions to the hibernation state, the power supply to the counter 52 and the counter 54 may be cut off. The values of measured by the counter 52 and the counter 54 become the value of 0 (initial value) after the memory system 1a wakes up from the hibernation state. Then, the counter 52 and the counter 54 count again the number of times the table data in the retention SRAM 25 is newly updated and the number of times of the memory access, respectively.

(2)-(b) Operation Example of Memory System

Subsequently, the operation example of the memory system 1a is described by using FIG. 12.

First, the memory system 1a receives the Hibernate enter request command from the host 4 and transitions to the hibernation state (S22).

Subsequently, the memory system 1a receives the Hibernate exit request command from the host 4 and wakes up from the hibernation state (S23).

Subsequently, if the memory system 1a receives the Hibernate enter request command from the host 4 after waking up from the hibernation state (Yes in S24), the process returns to S22, and the same process as described above is performed.

Subsequently, after the memory system 1a wakes up from the hibernation state, if the Hibernate enter request command is not received from the host 4 (No in S24), the process proceeds to S25.

If the memory access is not performed N_count times, (No in S25), the process returns to S24, and the same process as described above is performed.

If the memory access is performed N_count times (Yes in S25), the process proceeds to S26.

If the table data updates M_count times (Yes in S26), the CPU 24 decreases the threshold value of the timer 22 by d_time (S27). Then, the process ends.

If the table data does not update M_count times (No in S26), the CPU 24 increases the threshold value of the timer 22 by i_time (S28). Then, the process ends.

The memory system 1a is controlled as described above.

The CPU 24 can appropriately change the values of N_count, M_count, i_time, and d_time. The host 4 may change the values of N_count, M_count, i_time, and d_time.

In the memory system 1a according to the present embodiment, the threshold value with respect to the retention stay time of the retention SRAM 25 is set. The threshold value is calculated based on the number of times the table data in the retention SRAM 25 is newly updated. If the retention stay time of the retention SRAM 25 exceeds the set threshold value, it is highly likely that the table data stored in the retention SRAM 25 will not be referenced after the memory system 1a wakes up from the hibernation state. Therefore, the SRAM power supply control circuit 28 cuts off the power supply to the storage circuit 252 of the retention SRAM 25 and transitions the retention SRAM 25 to the power down state. As a result, the current consumed by the storage circuit 252 of the retention SRAM 25 can be reduced.

(3) Modification

In the above embodiments, the threshold value of the timer 22 may be written to the nonvolatile memory 3 when there is an update to the threshold value of the timer 22. Then, the threshold value of the timer 22 written to the nonvolatile memory 3 may be read as required.

Figure 13:
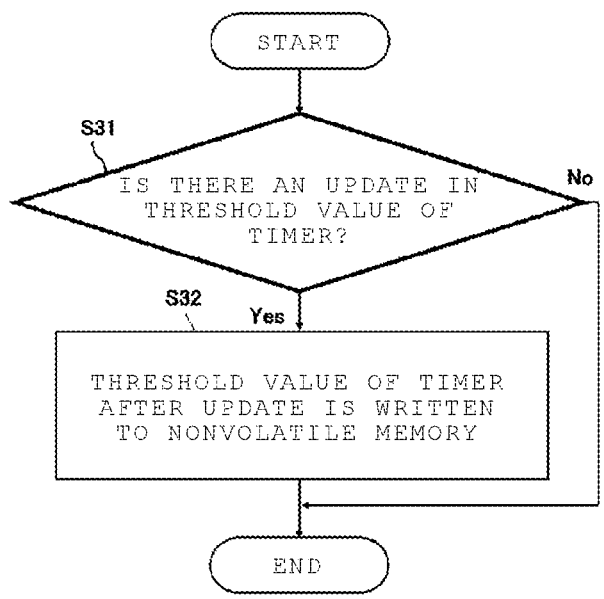
FIG. 13 is a diagram illustrating an operation example of a memory system according to a modification of one or more embodiments.

By using FIG. 13, an operation example of the memory system 1 (1a) according to the modification is described.

If there is an update to the threshold value of the timer 22 (Yes in S31), the threshold value of the timer 22 after the update is written to the nonvolatile memory 3 (S32). Then, the process ends.

Subsequently, if there is not an update to the threshold value of the timer 22 (No in S31), the process ends.

As described above, the control of the memory system 1 (1a) according to the modification is performed.

The CPU 24 of the memory system 1 (1a) sets the threshold value of the timer 22 based on the likelihood that the table data stored in the retention SRAM 25 will be referenced after the memory: system 1 (1a) wakes up from the hibernation state. If a state where the memory system 1 (1*a*) is not used at all is continued, the memory system 1 (1*a*) may be in the power off state where the power supply to the memory system 1 (1*a*) is completely cut off. If the memory system 1 (1*a*) transitions to the power off state, the values of the history of the hibernation wake-up time stored in the register 276 and the like are removed. Therefore, the threshold value of the timer 22 until the memory system 1 (1*a*) transitions to the power off state cannot be referenced.

In the present modification, if the memory system 1 (1*a*) is used again, an operation matching to the method used until the memory system 1 (1*a*) transitioned to the power off state can be performed by referring to the threshold value of the nonvolatile timer 22. That is, for example, even if the power supply to the host 4 is once turned off and again turned on, the same setting can be continued by writing and non-volatilizing (persisting) the threshold value of the timer 22 in the nonvolatile memory 3.

According to at least one of the embodiments described above, if the memory system transitions to the low power state, the consumed current of the table cache can be reduced by controlling the timing for transitioning the table cache from the retention state to the power down state based on either of (1) the threshold value used for the average value of the history of the time of waking up from the low power state or (2) the number of times of writing and reading the data to and from the nonvolatile memory and the number of times of updating a portion of the table data in the table cache.

The above embodiments and the modification can be combined as possible. For example, the modification can be combined with either of the first embodiment or the second embodiment.

In the above embodiments and the modification, the description of "connection" is not limited to the case where the two components are directly connected without the other elements. The case where the two components are indirectly connected via the other elements can be appropriately included according to the relationship between the components.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory system capable of being connected to a host and capable of transitioning to a low power state or a power off state in response to a command from the host, the memory system comprising:
    a nonvolatile memory configured to store table data; and
    a memory controller configured to perform predetermined control including writing and reading data to and from the nonvolatile memory based on a request from the host, wherein the memory controller includes
        a SRAM including a storage circuit configured to temporarily store a portion of the table data, and a control circuit configured to control input and output of data to the storage circuit, wherein the SRAM can be in either a retention state during which power is supplied to the storage circuit and power to the control circuit is cut off or a power down state during which power to both the storage circuit and the control circuit is cut off, when the memory system is in the low power state,
        a timer configured to measure elapsed time starting from when the memory system transitions to the low power state, and
        a register in which one or more previously measured elapsed times are stored, and in which a current measured elapsed time is stored when the memory system wakes up from the low power state, and
    wherein the memory controller is configured to control the SRAM to transition to the retention state when the memory system transitions to the low power state, and control a timing of transitioning the SRAM from the retention state to the power down state, if the measured elapsed time is greater than a threshold value, which is calculated based on the one or more previously measured elapsed times.

2. The memory system according to claim 1, wherein the threshold value is a value set based on an average value of the previously measured elapsed times and a first value.

3. The memory system according to claim 2, wherein the memory controller discards the previously measured elapsed times from the register if the current measured elapsed time, when the memory system wakes up from the low power state, is within a range of outlier time values that are greater than the average value of the previously measured elapsed times and less than the threshold value.

4. The memory system according to claim 3, wherein the range of outlier time values are set based on the average value of the previously measured elapsed times and a second value that is less than the first value.

5. The memory system according to claim 1, wherein the table data is a logical-to-physical address conversion table.

6. The memory system according to claim 1, wherein the memory controller writes the threshold value in the nonvolatile memory each time when the threshold value is updated and reads the threshold value written to the nonvolatile memory when the memory system wakes up from the low power state or the power off state.

7. The memory system according to claim 1, wherein the low power state is a hibernation state, and the nonvolatile memory is a NAND-type flash memory.

8. The memory system according to claim 1, wherein
    the storage circuit and the control circuit are connected in parallel between a first line at a power supply voltage and a second line at a ground voltage, and
    the memory controller causes the power supply voltage to be supplied to the storage circuit, but not to the control circuit when the SRAM is in the retention state and causes the power supply voltage to be not supplied to the storage circuit and the control circuit when the SRAM is in the power down state.

9. The memory system according to claim 8, wherein the SRAM further includes
    a first switch connected in series with the storage circuit between the first line and the second line and configured to control supply of the power supply voltage to the storage circuit, and
    a second switch connected in series with the control circuit between the first line and the second line and configured to control supply of the power supply voltage to the control circuit.

10. A memory system capable of being connected to a host and capable of transitioning to a low power state or a power off state in response to receiving a command from the host, the memory system comprising:
- a nonvolatile memory configured to store table data; and
- a memory controller configured to perform predetermined control including writing and reading data to and from the nonvolatile memory based on a request from the host, wherein the memory controller includes
  - a SRAM including a storage circuit configured to temporarily store a portion of the table data, and a control circuit configured to control input and output of data to the storage circuit, wherein the SRAM can be in either a retention state during which power is supplied to the storage circuit and power to the control circuit is cut off or a power down state during which power to both the storage circuit and the control circuit is cut off, when the memory system is in the low power state,
  - a timer configured to measure elapsed time starting from when the memory system transitions to the low power state,
  - a first counter configured to count the number of times the nonvolatile memory is written to or read from, and
  - a second counter configured to count the number of times a portion of the table data in the volatile memory is updated, and
- wherein the memory controller is configured to control the SRAM to transition to the retention state when the memory system transitions to the low power state, and control a timing of transitioning the SRAM from the retention state to the power down state based on count values of the first counter and the second counter.

11. The memory system according to claim 10, wherein the memory controller transitions the volatile memory from the retention state to the power down state, if the measured elapsed time exceeds a threshold value calculated based on the count value of the second counter.

12. The memory system according to claim 11, wherein the memory controller reduces the threshold value if the count value of the first counter is greater than a first count threshold and the count value of the second counter is greater than a second count threshold, and the controller increases the threshold value if the count value of the first counter is greater than the first count threshold and the count value of the second counter is less than the second count threshold.

13. The memory system according to claim 10, wherein the table data is a logical-to-physical address conversion table.

14. The memory system according to claim 10, wherein the memory controller writes the threshold value in the nonvolatile memory each time when the threshold value is updated and reads the threshold value written to the nonvolatile memory when the memory system wakes up from the low power state or the power off state.

15. The memory system according to claim 10, wherein the low power state is a hibernation state, and the nonvolatile memory is a NAND-type flash memory.

16. The memory system according to claim 10, wherein the storage circuit and the control circuit are connected in parallel between a first line at a power supply voltage and a second line at a ground voltage, and
the memory controller causes the power supply voltage to be supplied to the storage circuit, but not to the control circuit when the SRAM is in the retention state and causes the power supply voltage to be not supplied to the storage circuit and the control circuit when the SRAM is in the power down state.

17. The memory system according to claim 16, wherein the SRAM further includes
- a first switch connected in series with the storage circuit between the first line and the second line and configured to control supply of the power supply voltage to the storage circuit, and
- a second switch connected in series with the control circuit between the first line and the second line and configured to control supply of the power supply voltage to the control circuit.

18. A method of managing power in a memory system that is connected to a host and transitions into a low power state or a power off state in response to a command from the host, wherein the memory system includes a nonvolatile memory configured to store a logical-to-physical address conversion table, a memory controller configured to perform predetermined control including writing and reading data to and from the nonvolatile memory based on a request from the host, the memory controller including a SRAM including a storage circuit configured to temporarily store a portion of the table data, and a control circuit configured to control input and output of data to the storage circuit, wherein the SRAM can be in either a retention state during which power is supplied to the storage circuit and power to the control circuit is cut off or a power down state during which power to both the storage circuit and the control circuit is cut off, a timer, and a register, when the memory system is in the low power state, said method comprising:
- storing a portion of the logical-to-physical address conversion table in the SRAM;
- storing one or more previously measured elapsed times in the register;
- with the timer, measuring elapsed time starting from when the memory system transitions to the low power state in response to the command to transition into the low power state from the host;
- transitioning the SRAM to the retention state in accordance with the memory system transitions to the low power state in response to the command;
- detecting that the measured elapsed time is greater than a threshold value, which is calculated based on the one or more previously measured elapsed times stored in the register; and
- upon detecting that the measured elapsed time is greater than a threshold value, transitioning the SRAM from the retention state to the power down state.

19. The method according to claim 18, wherein the threshold value is a value set based on an average value of the previously measured elapsed times and a first value.

20. The method according to claim 18, wherein the table data is a logical-to-physical address conversion table.

* * * * *